United States Patent
Kudo et al.

(10) Patent No.: US 7,495,237 B2
(45) Date of Patent: Feb. 24, 2009

(54) RADIATION IMAGE CONVERSION PANEL AND MANUFACTURING METHOD THEREOF

(75) Inventors: Shinji Kudo, Hino (JP); Takehiko Shoji, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 85 days.

(21) Appl. No.: 11/720,460

(22) PCT Filed: Nov. 29, 2005

(86) PCT No.: PCT/JP2005/021864

§ 371 (c)(1),
(2), (4) Date: May 30, 2007

(87) PCT Pub. No.: WO2006/062006

PCT Pub. Date: Jun. 15, 2006

(65) Prior Publication Data

US 2008/0157001 A1 Jul. 3, 2008

(30) Foreign Application Priority Data

Dec. 6, 2004 (JP) .............................. 2004-353001

(51) Int. Cl.
*H05B 33/00* (2006.01)

(52) U.S. Cl. ................................................. 250/484.4
(58) Field of Classification Search .... 250/484.2–484.5
See application file for complete search history.

(56) References Cited

U.S. PATENT DOCUMENTS

2005/0077479 A1 * 4/2005 Isoda et al. .............. 250/484.4

FOREIGN PATENT DOCUMENTS

| JP | 6373200 | 4/1988 |
|----|---------|--------|
| JP | 5150100 | 6/1993 |
| JP | 634800 | 2/1994 |
| JP | 200091224 | 3/2000 |
| JP | 200477371 | 3/2004 |
| JP | 200638470 | 2/2006 |

* cited by examiner

*Primary Examiner*—David P Porta
*Assistant Examiner*—Kiho Kim
(74) *Attorney, Agent, or Firm*—Lucas & Mercanti, LLP

(57) ABSTRACT

A method of producing a radiation image conversion panel containing the steps of: forming a stimulable phosphor layer on a substrate via a vapor deposition method to form a phosphor panel; heating the phosphor panel in a gas atmosphere of a halogen-containing solvent; and sealing the phosphor panel heated in the gas atmosphere of the halogen-containing solvent by sandwiching the phosphor panel between two resin films, followed by applying heat to peripheral edges of the two resin films to heat and fuse the resin films each other, wherein a lowest temperature of the heat is 150° C. or more.

5 Claims, 2 Drawing Sheets

RADIATION IMAGE CONVERSION PANEL AND MANUFACTURING METHOD THEREOF

TECHNICAL FIELD

This invention relates to a radiation image conversion panel used when forming a radiation image for a subject.

BACKGROUND

Up to now, radiation images such as X-ray images have been widely used in diagnosing sicknesses at medical institutions. In particular, radiation images obtained by using intensifying screen and films have achieved high sensitivity and high quality over the long history, and as a result, they are still being used worldwide as highly reliable systems which also have excellent cost-performance. In recent years, computed radiography using stimulable phosphor panels as radiation image conversion panels has also been commercialized and improvements in terms of high sensitivity and image quality are being continuously made.

The stimulable phosphor panel referred to above is one in which radiation rays which have been transmitted through a subject is accumulated, and the accumulated rays are emitted as stimulated luminescence by radiation of excitation light with an intensity in accordance with the amount of rays. The stimulable phosphor panel has a structure in which a stimulable phosphor layer is formed on a prescribed substrate. One example of a manufacturing method for this type of stimulable phosphor panel is disclosed in Patent Document 1. In the manufacturing method described in Patent Document 1, a stimulable phosphor panel is manufactured by forming a stimulable phosphor layer on a prescribed substrate using a known vapor-phase deposition method, and then subjecting the stimulable phosphor panel to heat processing (see paragraph 0034 and 0035).

It is to be noted that in the case where the foregoing stimulable phosphor panel is used as the radiation image conversion panel, a stimulable phosphor panel is generally interposed between two films made of resin and the side edges of the films are heated to fuse and thus the phosphor panel is sealed between the films. If the film is not heated and fused at a suitable temperature, the desired space will not be formed between the stimulable phosphor layer of the stimulable phosphor panel and the film (that is, the stimulable phosphor layer and the film are brought in close contact but the space is narrower than necessary) and there is the possibility that image unevenness or linear noise will occur on the radiation image.

[Patent Document 1] Japanese Patent Application Laid-Open No. 2003-279696

DISCLOSURE OF THE INVENTION

An object of the present invention is to provide a radiation image conversion panel which prevents occurrence of image unevenness or linear noise and a manufacturing method thereof.

One aspect of the present invention for achieving the abovementioned object is a method of producing a radiation image conversion panel containing the steps of: forming a stimulable phosphor layer on a substrate via a vapor deposition method to form a phosphor panel; heating the phosphor panel in a gas atmosphere of a halogen-containing solvent; and sealing the phosphor panel heated in the gas atmosphere of the halogen-containing solvent by sandwiching the phosphor panel between two resin films, followed by applying heat to peripheral edges of the two resin films to heat and fuse the resin films each other, wherein a lowest temperature of the heat is 150° C. or more.

DESCRIPTION OF THE PREFERRED EMBODIMENTS

Figure 1:
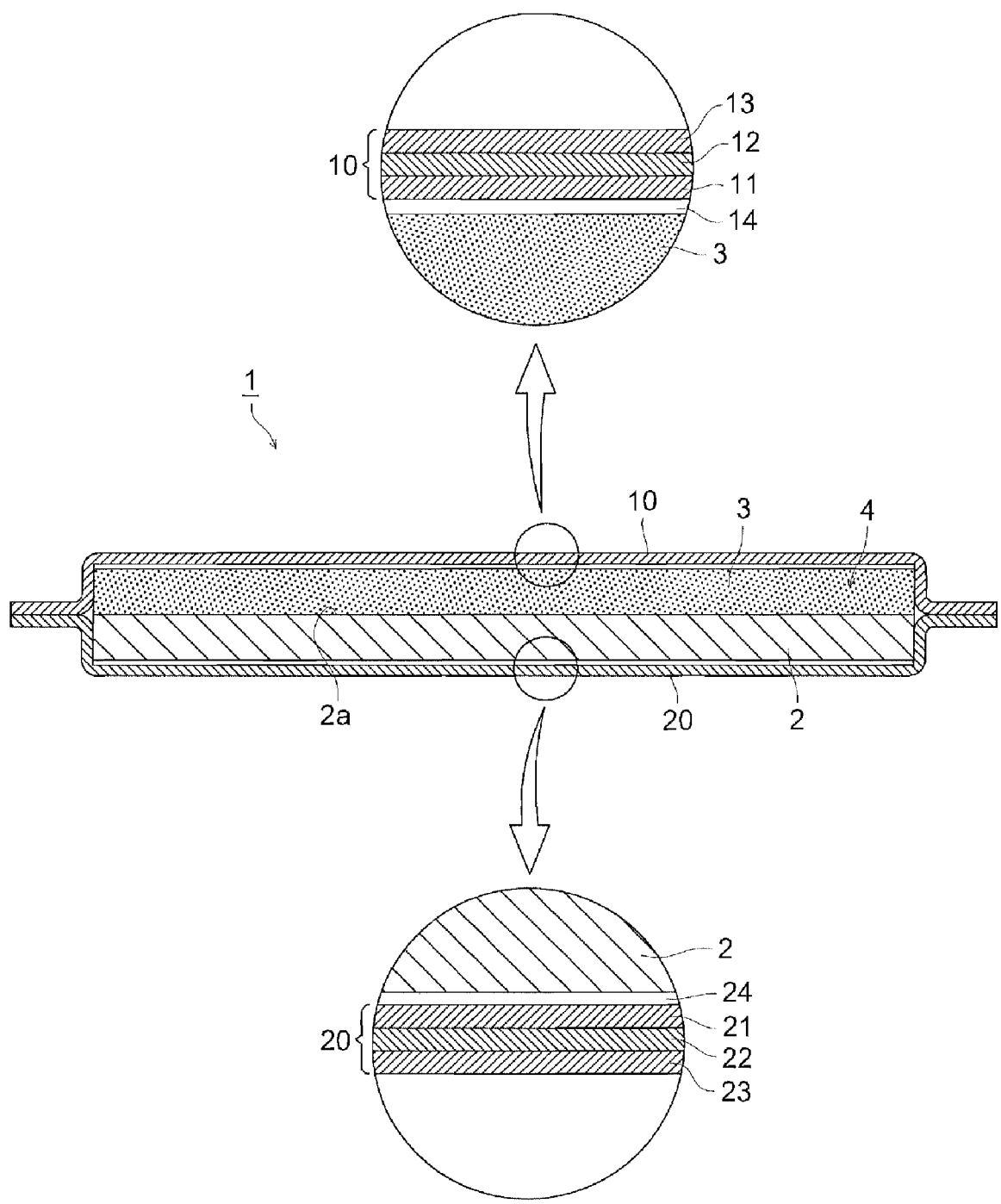
FIG. 1 shows a cross-section of the radiation image conversion panel.

The above object of the present invention is achieved by the following structures.

(1) A method of producing a radiation image conversion panel comprising the steps of:
forming a stimulable phosphor layer on a substrate via a vapor deposition method to form a phosphor panel;
heating the phosphor panel in a gas atmosphere of a halogen-containing solvent; and
sealing the phosphor panel heated in the gas atmosphere of the halogen-containing solvent by sandwiching the phosphor panel between two resin films, followed by applying heat to peripheral edges of the two resin films to heat and fuse the resin films each other, wherein a lowest temperature of the heat is 150° C. or more.

(2) The method of Item (1), wherein the lowest temperature is 150 to 171° C.

(3) The method of Item (1), wherein the halogen-containing solvent is HFE.

(4) The method of Item (1), wherein the halogen-containing solvent comprises a colorant which absorbs excitation light.

(5) A radiation image conversion panel produced by the method of Item (1).

The following is a description of the preferred embodiments for realizing the present invention with reference to the drawings. However, the present invention is not to be limited by the examples shown in the drawings.

FIG. 1 is a cross-section of the radiation image conversion panel 1.

As shown in FIG. 1, the radiation image conversion panel 1 contains a phosphor panel 4 on which the stimulable phosphor layer 3 is formed on a prescribed substrate 2.

The substrate 2 has a rectangular configuration. The substrate 2 is formed of a polymer material, glass, metal or the like and preferred examples specifically include plastic film such as cellulose acetate film, polyester film, polyethylene terephthalate film, polyamide film, polyimide film, triacetate film and polycarbonate film; plate glass such as quartz, borosilicate glass, chemically tempered glass; metal sheets such as aluminum sheet, iron sheet and copper sheet, or chrome sheet and metal sheet covered with the metallic oxide layer.

The surface $2a$ of the substrate 2 (upper surface in FIG. 1) may be a smooth surface or a matte surface. An undercoat layer may be provided on the surface $2a$ of the substrate 2 in order to enhance adhesion to the stimulable phosphor layer 3, and an antireflection layer may be provided in order to prevent excitation light from passing through the substrate 2 and becoming incident on the stimulable phosphor layer 3.

The stimulable phosphor layer 3 is formed from a known stimulable phosphor such as CsBr:Eu using a known vapor-phase deposition method such as evaporation, sputtering, CVD (chemical vapor deposition), PVD (physical vapor deposition) or ion plating. The stimulable phosphor layer 3 may be formed of 1 layer or may be formed of 2 or more layers.

Figure 2:
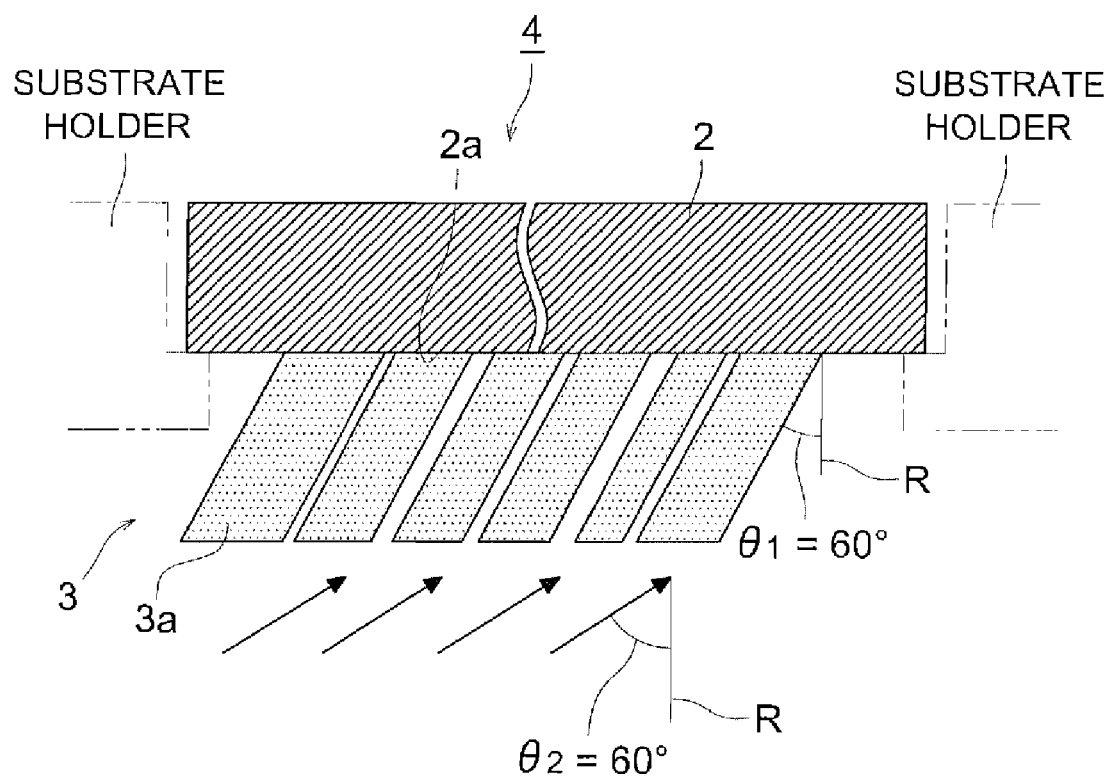
FIG. 2 is an enlarged cross-section of the phosphor panel.

FIG. 2 is an enlarged cross section of the phosphor panel 4 in which the stimulable phosphor layer 3 is viewed macroscopically.

As shown in FIG. 2, the stimulable phosphor layer 3 has a columnar structure in which multiple columnar crystals 3a, 3a, . . . that are formed from the stimulable phosphor are aligned with spaces between each other. Each columnar crystal 3a is inclined at a prescribed angle with respect to the normal line R of the surface 2a of the substrate 2. In FIG. 2, the stimulable phosphor layer is constitute of one layer having multiple columnar crystals 3a, 3a, . . . but this stimulable phosphor layer 3 may also have a laminated structure in which 2 or more layers formed of multiple columnar crystals 3a, 3a, . . . are laminated and regardless of the number of the number of layers the total layer thickness is preferably formed to be more than 50 μm, and more preferably 300-500 μm.

As shown in FIG. 1, the phosphor panel 4 which has the foregoing structure is provided between the moisture proof first protective film 10 that is provided on the stimulable phosphor layer 3 and the moisture proof second protective film 20 that is provided under the substrate 2.

The first protective film 10 has a slightly larger surface area than the phosphor panel 4, and when substantially not adhered to the stimulable phosphor layer 3 of the phosphor panel 4, the peripheral edges thereof extend further outward than the peripheral edge of the phosphor panel 4. "The first protective film 10 being substantially not adhered to the stimulable phosphor layer 3" refers to the state where the first protective film 10 and the stimulable phosphor layer 3 are not optically integral, and more specifically refers to the state where the contact surface area between the first protective film 10 and the stimulable phosphor layer 3 is less than 10% of the front surface area of the surface of the stimulable phosphor layer 3 (the surface facing to the first protective film).

The second protective film 20 also has a surface area that is slightly larger than that of the phosphor panel 4 and the peripheral edges thereof extend further outward than the peripheral edge of the phosphor panel 4.

In the radiation image conversion panel 1, the peripheral edges of the first and second protective films 10 are fused along the entire periphery and the first and second protective films 10 and 20 completely seal the phosphor panel 4. Because the first and second protective films 10 and 20 seal the phosphor panel 4, prevention of entry of water into the phosphorous panel 4 is ensured and the phosphor panel 4 is protected.

As shown in the enlarged drawing at the upper portion of FIG. 1, the first protective film 10 has a laminate structure in which 3 layers including the first layer 11, the second layer 12, and the third layer 13 are laminated.

The first layer 11 is a layer which faces the stimulable phosphor layer 3 of the phosphor panel 4 via the air layer 14 and is formed of a resin that has thermal adhesiveness. Examples of a "resin that has thermal adhesiveness" include ethylene vinyl acetate (EVA), casting polypropylene (CPP) and polyethylene (PE).

The second layer 12 is a layer that is formed of metal oxides such as alumina, silica and the like and is deposited under the third layer 13 by a known deposition method. The second layer 12 is for enhancing moisture resistance of the first protective film 10 and it may not be provided.

The third layer 13 is laminated on the second layer 12 and is formed of a resin of polyethylene terephthalate (PET) and the like.

In this manner, the first protective film 10 having a second layer 12 formed of a metal oxide has excellent processing properties and transparency and is unlikely to be affected by temperature and humidity in view of moisture resistance and oxygen permeability properties. For this reason, the first protective film 10 is suitable for use as medical radiation conversion panel 1 using a stimulable phosphor which requires stable image quality regardless of the environment.

It is to be noted that one or more of a layer which is the same as the first layer 11, a layer which is the same as the second layer 12, and a layer which is the same as the third layer 13 or a layer formed of a resin that is different from that of the first layer 11 and the third layer 13 may be laminated on the third layer 13.

In particular, when a layer which is the same as the second layer 12 formed of a metal oxide such as silica or alumina is laminated on the third layer 13, the first protective film 10 exhibits optimal moisture resistance properties in accordance with the number of laminated layer corresponding to the second layer 12. The method for laminating the second layer 12 or the layer which is the same as this layer can be any known method, but a method for a dry laminate system is preferably used in view of operation properties.

As shown in the enlarged diagram at the lower portion of FIG. 1, the second protective film 20 has a laminate structure of 3 layers in which the first layer 21, the second layer 22, and the third layer 23 are laminated.

The first layer 21 faces the substrate 2 of the phosphor panel 4 via the air layer 24. The first layer 21 is formed of a resin that is the same as that of the first layer 11 of the first protective film 10 and fuses with the first layer 11 of the first protective film 10 at the peripheral edges.

The second layer 22 is a layer that is laminated under the first layer 21 and is formed of aluminum. The second layer 22 is for improving moisture resistance of the second protective film 20 and it is not necessarily provided.

The third layer 23 is laminated under the second layer 22 and is formed of a resin such as PET and the like.

It is to be noted that one or more of a layer which is the same the first layer 21, a layer which is the same as the second layer 22, and a layer which is the same the third layer 23 or a layer formed of a resin that is different from that of the first layer 11 and the third layer 13 may be laminated on the third layer 23.

Next, the manufacturing method for the radiation image conversion panel 1 will be described.

First, a prescribed substrate 2 is prepared and then a stimulable phosphor layer 3 is formed on the substrate 2 using a known vapor-phase deposition method (called stimulable phosphor layer formation step hereinafter).

For example, of the multiple known vapor-phase deposition methods, the case where the stimulable phosphor layer 3 is formed using the evaporation method is described simply in the following. As shown in FIG. 2, the substrate 2 is fixed or placed in the substrate holder inside the evaporation apparatus and then the inside of the evaporation apparatus is evacuated to a vacuum state. Subsequently, the stimulable phosphor is heated and evaporated with said stimulable phosphor as the evaporation source, using a method such as the resistance heating method or the electron beam method and the stimulable phosphor is grown on the surface 2a of the substrate 2 until it reaches a desired thickness and the stimulable phosphor layer 3 is thereby formed on the substrate 2.

Given that the angle of incidence of the vapor stream of stimulable phosphor with respect to the normal line R of the surface 2a of the substrate 2 that is fixed in the substrate holder inside the evaporation apparatus herein is θ2, and the inclination angle of the columnar crystal 3a that is to be formed is θ1, the incline angle θ1 is empirically approximately half of the angle of incidence θ1, and many columnar crystals 3a, 3a, . . . are formed with the incline angle θ1 corresponding to the angle of incidence θ2. That is to say, when the angle of incidence θ2=60°, if the vapor stream of the stimulable phosphor is made incident on the surface 2a of the substrate 2, multiple columnar crystals 3a, 3a, . . . having an inclination angle of θ1=30° can be formed on the surface 2a of the substrate 2.

Examples of the methods for supplying vapor streams of the stimulable phosphor at a prescribed angle of incidence with respect to the surface 2a of the substrate 2 include the method of arranging the substrate 2 to be inclined with respect to the evaporation source and a method in which the substrate 2 and evaporation source are placed so as to be parallel to each other such that only oblique components of vapor stream of the stimulable phosphor evaporate from the evaporation surface through a slit or the like.

After the processes in the stimulable phosphor layer formation step are complete, the phosphor panel 4 is placed inside a known constant temperature bath and the inside of thermostatic bath forms an organic solvent gas environment and in that environment, the phosphor panel 4 is heated for a prescribed period to over 100° C. (preferably between 100° C. and 160° C.). This is called the heating step hereinafter.

Next the "organic solvent" that can be used in the heating process will be described.

A halogen based organic solvent is preferably used as the organic solvent. Halogen based organic solvent refers to a solvent including a compound in which at least one of the hydrogen atoms in a hydrocarbon compound is replaced with a halogen atom such as F, Cl, Br or I. The halogen based solvent may be a compound having a structure in which the bonds between each of the elements are only saturated bonds, or compounds including unsaturated bonds, cyclic compounds, chain compounds, or compounds in which the atoms or molecules in the compound are substituted with a hydroxide group, an ether group, a carbonyl group, or a carboxyl group.

Compounds which are preferable as the halogen based solvent are (1) non-combustible solvents which do not have a flash point in view of fire protection laws related to supply to the heating process (in view of flammability and combustibility, the compound must have properties such as no flash point). In this case, the heating temperature can be optimally selected without referring to the type of halogen based solvent, but it is preferable that the heating temperature is a temperature below the flash point.

Furthermore, in view of the aforementioned (1) as well as (2) environmental suitability and (3) harmful effects on living things, it is believed that alternatives for chlorofluorocarbon to which much attention is being given, are effective. Among these, the latest alternative for chlorofluorocarbon which is excellent in terms of (2) and (3) "HFE (hydrofluoro ether)", can be suitably used as the halogen based solvent.

HFE is formed from carbon, fluorine, hydrogen, and one or more ether oxygen atoms, and furthermore one or more hetero atoms incorporated into a carbon chain such as sulfur or trivalent nitrogen atoms may be included. HFE may form a straight chain or may be branched or cyclic or a combination thereof, and may be, for example, an alkyl alicyclic type. However, it is preferable that HFE contains no unsaturated bond.

As s specific example of HFE, a compound represented by the following formula is usable.

$$(R4-O)a-R5 \qquad (4)$$

In formula (4) "a" may be a number from 1 to 3 and "R4" and "R5" may be selected from a group containing an alkyl group and an aryl group and they may be the same or different. At least one of "R4" and "R5" includes at least one fluorine atom and at least one hydrogen atom, and at least one of or both of "R4" and "R5" may include a hetero atom in one or more chains. The total number of fluorine atoms in HFE is preferably greater than the total number of hydrogen atoms. "R4" and "R5" may form a straight chain or may be branched or cyclic. Furthermore, it may include one or more unsaturated carbon-carbon bonds, but both of "R4" and "R5" are preferably atomic groups in which the elements have saturated bonds.

Examples of HFE which have these properties include Novec (registered trademark) HFE 7100, 7100DL, and 7200 manufactured by Sumitomo 3M and HFE-S7 (trade name) manufactured by Daikin Industries. These commercially available HFE may be suitably used as the halogen based solvent which can be used in this heating step.

It is to be noted that the halogen based solvent may include a "colorant" which absorbs excitation light. By including a colorant in the halogenated solvent, during the heating process the colorant penetrates all areas between the columnar crystals 3a and dispersion of the excitation light incident in the space between the columnar crystals 3a is prevented.

The type of colorant used may be determined by the type of stimulable phosphor. Because a stimulable polymer which exhibits stimulated luminescence in the wavelength range of 300-500 nm when excited with the excitation light of wavelength 400-900 nm is normally used in the radiation image conversion panel 1, the colorant used is preferably a blue— green organic colorant or an inorganic colorant.

Examples of the blue to green organic colorant include Neozapon Blau 807 (manufactured by BASF AG), Zapon First Blue 3G (manufactured by Hoechst AG), Estrol Brill Blue N-3RL (manufactured by Sumitomo Chemical Co., Ltd.), Sumiacryl Blue N-3RL (manufactured by Sumitomo Chemical Co., Ltd.), D & C Blue No. 1 (manufactured by National Aniline AG), Spirit Blue (manufactured by Hodogaya Kagaku Co., Ltd.), Oil Blue No. 603 (manufactured by Orient Co., Ltd.), Kiton Blue A (manufactured by Chiba-Geigy Co.), Aizen Cathilon Blue GLH (manufactured by Hodogaya Kagaku Co., Ltd.), Lake Blue AFH (Kyowa Sangyo Co., Ltd.), Primocyanine 6GX (manufactured by Inahata Sangyo Co., Ltd.), Brillacid Green 6BH (manufactured by Hodogaya Kagaku Co., Ltd.), Cyanine Blue BNRS (Toyo Ink Co., Ltd.), and Lionol Blue SL (manufactured by Toyo Ink Co., Ltd.). Other examples of the blue to green inorganic colorants are ultramarine blue, cobalt blue, cerulean blue, chrome oxide, and TiO2-ZnO—CoO—NiO based pigments.

Aside from the colorants, the halogenated solvent may include material exhibiting high light absorbance or high light reflectance as a filler. It is useful in reducing lateral diffusion of stimulated emission light entering the stimulable phosphor layer 3 to fill spacing between columnar crystals 3a with a filler such as high light absorbance material or high light reflectance material.

After the heating step is complete, the phosphor panel 4 is placed as it is, inside a constant temperature bath, and the phosphor panel 4 is cooled until the temperature is reduced to a prescribed temperature (called the cooling step hereinafter). For example, the phosphor panel 4 may be kept inside the constant temperature bath for one hour or more until the phosphor panel 4 is cooled to near 50° C.

When the cooling step is complete, the phosphor panel 4 is removed from the constant temperature bath and the removed phosphor panel 4 is placed between the two films of first and second protective films 10 and 20. At this time, the first layer 11 of the first protective film 10 and the first layer 21 of the second protective film 20 face each other. In addition, in this state, the peripheral edges of the first and second protective films 10 and 20 are heated and sealed (heat-sealed) with an impulse sealer and the phosphor panel 4 is sealed between the first and second protective films (called the heat sealing step hereinafter). In addition, as described above, by performing each of the steps from the stimulable phosphor layer formation step to the sealing step, the radiation image conversion panel 1 can be manufactured.

In the heat sealing step herein, heat exceeding the minimum heat sealing temperature of 150° C. is applied to the peripheral edges of the first and second protective films 10 and 20 from the impulse sealer.

The minimum heat sealing temperature refers to the minimum heating temperature which satisfies the conditions of equation (5) given that the maximum heat sealing adhesion strength at the temperature at which sealing is possible without base destruction (heat shrinkage and burning of the first and second protective films 10 and 20 due to overheating) in the case where the pressing pressure of 2 MPa from the impulse sealer is applied to the edges of the first and second protective films for 1.0 second while the peripheral edges of the first and second protective films 10 and 20 are heat-sealed is "Fmax" and the heat sealing adhesion strength at a suitably selected temperature is "Fh".

$$Fh/Fmax \geq 0.75 \quad (5)$$

The "heat sealing adhesion strength" which defines "Fmax" and "Fh" is the heat sealing adhesion strength that is measured after the first and second protective films 10 and 20 are left for 2 hours in an environment of a temperature of 23° C. and relative humidity of 50% immediately after being heat sealed, and a commercially available push-pull gauge may be used for measuring the adhesion strength.

In the above embodiment, in the heat sealing process, heat exceeding the minimum heat sealing temperature of 150° C. is applied to the peripheral edges of the first and second protective films 10 and 20, and thus the phosphor panel 4 can be sealed between the first and second protective films 10 and 20 with the desired air layer 14 (spacing) formed between the stimulable phosphor layer 3 of the phosphor panel 4 and the first protective film 10. As a result, the amount of stimulated emission light from the radiation image conversion panel 1 can be significantly improved, and consequently, generation of image unevenness or linear noise in the radiation image will be prevented. (See the working examples below).

EXAMPLES

In the following examples, a plurality of types of samples modeling the radiation image conversion panel were prepared and image quality (presence of image unevenness and linear noise) was evaluated.

(1) Sample Preparation (1.1) Preparation of Phosphor Panel

A transparent crystal glass of a size of 10 cm×10 cm and a thickness of 500 μm was prepared as the substrate and a light reflective layer was formed on one surface of the substrate. The light reflective layer was formed on the substrate by evaporating titanium oxide (manufactured by Fruuchi Chemical Corporation) and zirconium oxide (manufactured by Fruuchi Chemical Corporation) using a known evaporation apparatus. The layer thickness was adjusted to have 85% of the light reflectance at a wavelength of 400 nm and 20% of the light reflectance at a wavelength of 660 nm.

Subsequently, a stimulable phosphor layer was formed on the light reflective layer of substrate by evaporating a stimulable phosphor comprised of CsBr:Eu on the light reflective layer of the substrate. More specifically, at first, the substrate was fixed in a vacuum chamber of an evaporation apparatus and heated up to 240° C. The surface of the substrate on which a light reflective layer was formed was arranged to face the evaporation source. In this state, nitrogen gas was introduced into the vacuum chamber and a degree of vacuum was set to 0.1 Pa. At this time, the evaporation source and substrate were placed to be a distance of 60 cm apart.

Next, an aluminum slit was also placed between the evaporation source and the substrate such that vapor streams from a stimulable phosphor material were introduced at an angle of 30° with respect to the line normal of the surface of the substrate on which the reflective layer was formed. Subsequently, evaporation was conducted while the substrate was conveyed in the direction of its surface and a stimulable phosphor layer with columnar crystals having thickness of 500 μm was formed on the reflective layer of the substrate to obtain a phosphor plate (stimulable phosphor layer formation step).

(1.2) Preparation of Sample 1

The phosphor panel prepared in (1.1) above was placed in a known constant temperature bath and heated for 1 hour at 140° C. in the environment of Novec HFE-7100 (C4F9OCH3) gas (manufactured by Sumitomo 3M Co., Ltd.) (heating step), and then the phosphor panel was placed, as it is, inside a constant temperature bath for 1 hour and cooled (cooling step).

Aside from the heating step and the cooling step, a polypropylene film having a thickness of 40 μm (polypropylene film RXC36 manufactured by Tohcello Co., Ltd.) and a 12 μm PET film (VMPET12 manufactured by Toyo Metallizing Co., Ltd) on which alumina has been evaporated were pasted together with a dry lamination system using 2 liquid reaction type urethane based adhesives.

After the processes of the heating step and the cooling step were complete and 2 protective films were prepared, the phosphor panel that was heated was placed between the protective films with the polypropylene film (sealant layer) of the each protective film facing each other, and then these were placed inside a vacuum chamber. Subsequently, the pressure inside the vacuum chamber was reduced to 200 Pa while helium gas was introduced to inside the vacuum chamber and the vacuum chamber was subjected to gas displacement, and then gas pressure inside the vacuum chamber was readjusted to 700 Pa.

In this pressure reduction, heat of the minimum heat sealing temperature of 140° C. was applied to the peripheral edges of the protective films from an impulse sealer (with a heater width of 8 mm) and the peripheral edges were heat-sealed to each other and the phosphor panel is sealed between the 2 protective films (heat sealing step). This is called "Sample 1". (The conditions for the heating step and the heat-sealing step in manufacturing sample 1 are also shown in Table 1 below).

(1.3) Preparation of Samples 2, 4 and 5

The "Samples 2, 4 and 5" were prepared in the same manner as in (1.2) above except that the conditions in (1.2) above for the processes in the heating step and the heat-sealing step (including the type of sealant layer in the protective film) were changed as shown in Table 1 below. However, in preparing Samples 4 and 5, in the processes of the heating step, colorant (Neozapon Blau 807 manufactured by BASF) was included in HFE (the content of the colorant was 0.03 weight %).

(1.4) Preparation of Sample 3

The phosphor panel prepared in (1.1) above was placed in a known constant temperature bath and heated for 1 hour at 100° C. in a nitrogen environment. Subsequently, Sample 3 was prepared in the same manner as in (1.2) above except that the conditions in (1.2) above for the processes in the heating step and the heat-sealing step (including the type of sealant layer in the protective film) were changed as shown in Table 1 below. However, in preparing Sample 3, in the processes of the heating step, colorant (Neozapon Blau 807 manufactured by BASF) was included in HFE (the proportion of the colorant was 0.03 weight %).

The foregoing image quality evaluation was performed twice in total. First evaluation was done immediately after manufacture (initial evaluation) and then after being kept for 14 days under conditions of 40° C. temperature and relative humidity of 90%. In the image quality evaluation, each sample was kept for 14 days under the above conditions of temperature and humidity in order to evaluate deterioration (changes due to humidity) with time for each of the samples. The results of the evaluation are shown in Table 1 below. It is to be noted that the evaluations "A", "B" and "C" in Table 1 are based on the following standards.

A . . . No image unevenness or linear noise was observed.

B . . . Slight image unevenness or linear noise was observed at 1 or 2 locations in the image.

C . . . Slight image unevenness or linear noise was observed at 3 or 4 locations in the image.

TABLE 1

| | Heating Step | | | | Heat-sealing Step *1 | | | 14 |
|---|---|---|---|---|---|---|---|---|
| Sample No. | Organic Solvent | Heating Temperature | Heating Time | Colorant | Sealant Layer of Protective Film | *2 | First Evaluation | days later |
| 1 | HFE | 140° C. | 1 hour | No colorant | Polypropylene film RXC36 (40 µm thickness) manufactured by Tohcello Co., Ltd. | 140° C. | B | C |
| 2 | HFE | 140° C. | 1 hour | No colorant | Polypropylene film RXC3 (40 µm thickness) manufactured by Tohcello Co., Ltd. | 150° C. | B | B |
| 3 | HFE | 140° C. | 1 hour | Colorant | Polypropylene film RXC11 (50 µm thickness) manufactured by Tohcello Co., Ltd. | 169° C. | A | A |
| 4 | HFE | 140° C. | 3 hour | Colorant | Polypropylene film GHC11 (30 µm thickness) manufactured by Tohcello Co., Ltd. | 152° C. | A | A |
| 5 | HFE | 140° C. | 4 hour | Colorant | Polypropylene film S (30 µm thickness) manufactured by Tohcello Co., Ltd. | 171° C. | A | A |

*1: Image Unevenness and Linear Noise,
*2: Minimum Heat-sealing Temperature (2) Evaluation of Image Quality (Presence of Image Unevenness and of Linear Noise)

X-ray with a tube voltage of 80 kVp was irradiated onto the back surface of each sample (not the surface where the stimulable phosphor layer is formed). Subsequently, a semiconductor laser was used to scan the front surface of each sample (the surface where the stimulable phosphor layer is formed) and the stimulable phosphor layer is excited, and the light amount (light intensity) of the stimulated luminescence radiated from the stimulable phosphor layer for all the samples were received by a receptor (photoelectron image multiplier tube having spectral sensitivity of S-5) and then converted to electric signals. Subsequently, the image based on the converted electric signals that was enlarged two times was printed out using a known printer and the printed image was visually observed, and the image quality (presence of image unevenness and linear noise) was evaluated.

As shown in Table 1, in Samples 2-5 in which heat exceeding the minimum heat sealing temperature of 150° C. is applied to the peripheral edges of the films, the results of image quality evaluation were favorable, and it is clear that applying heat which exceeds the minimum heat sealing temperature of 150° C. to the peripheral edges of the protective films to heat and fuse each other is effective.

Possibility for Practical Use

According to the present invention, since the heat of which lowest temperature is 150° C. is applied to the peripheral edge of each film in the heat seal step, the phosphor panel can be sealed between the films, while a desired void space is formed between the stimulable phosphor layer of the phosphor panel and the film, whereby a notably improved amount of stimulated light can be obtained, resulting in preventing the generation of image unevenness and a linear noise in the radiation image.

What is claimed is:

1. A method of producing a radiation image conversion panel comprising the steps of:

forming a stimulable phosphor layer on a substrate via a vapor deposition method to form a phosphor panel;

heating the phosphor panel in a gas atmosphere of a halogen-containing solvent; and sealing the phosphor panel heated in the gas atmosphere of the halogen-containing solvent by sandwiching the phosphor panel between two resin films, followed by applying heat to peripheral edges of the two resin films to heat and fuse the resin films each other, wherein a lowest temperature of the heat is 150° C. or more.

2. The method of claim 1, wherein the lowest temperature is 150 to 171° C.

3. The method of claim 1, wherein the halogen-containing solvent is HFE.

4. The method of claim 1, wherein the halogen-containing solvent comprises a colorant which absorbs excitation light.

5. A radiation image conversion panel produced by the method of claim 1.

* * * * *